(12) United States Patent
Strähle

(10) Patent No.: US 7,483,149 B2
(45) Date of Patent: Jan. 27, 2009

(54) OPTICAL MEASURING DEVICE FOR MEASURING CURVED SURFACES

(75) Inventor: Jochen Strähle, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 11/232,782

(22) Filed: Sep. 21, 2005

(65) Prior Publication Data
US 2006/0061774 A1      Mar. 23, 2006

(30) Foreign Application Priority Data
Sep. 22, 2004   (DE) ....................... 10 2004 045 807

(51) Int. Cl.
*G01B 11/02*       (2006.01)
(52) U.S. Cl. ..................................... 356/512
(58) Field of Classification Search ................ 356/489, 356/497, 511, 512, 513
See application file for complete search history.

(56) References Cited

U.S. PATENT DOCUMENTS

| | | | |
|---|---|---|---|
| 4,387,994 A * | 6/1983 | Balasubramanian | 356/513 |
| 5,563,706 A * | 10/1996 | Shibuya et al. | 356/495 |
| 6,184,994 B1 * | 2/2001 | Freischlad | 356/511 |
| 7,072,042 B2 * | 7/2006 | Kim et al. | 356/458 |
| 2004/0036890 A1 * | 2/2004 | Nakayama et al. | 356/513 |

FOREIGN PATENT DOCUMENTS

| | | |
|---|---|---|
| DE | 101 31 778 | 1/2003 |
| DE | 103 25 443.9 | 12/2004 |

OTHER PUBLICATIONS

Three-dimensional sensing of rough surfaces by coherence radar (T. Dresel, G. Häusler, H. Venzke, Appl. Opt. 31 (7), pp. 919-925, 1992).

* cited by examiner

*Primary Examiner*—Michael A Lyons
(74) *Attorney, Agent, or Firm*—Kenyon & Kenyon LLP

(57) ABSTRACT

An optical measuring device for measuring curved surfaces of a measured object. The curved surface to be measured may at least partially have the internal or external shape of a conical or cylindrical surface or of a saddle surface. The measuring device has a system of optical elements which includes at least one lens system and a first deflection optics. The lens system and the first deflection optics are positioned so that a first part of the light beams incident on the lens system is directed perpendicularly onto the curved surfaces of the measured object via the first deflection optics, while a second part of the light beams incident on the lens system is directed onto a reference object. Simultaneous measurement of locations of the measured object which are difficult to access and a reference object is thus made possible.

7 Claims, 3 Drawing Sheets

OPTICAL MEASURING DEVICE FOR MEASURING CURVED SURFACES

FIELD OF THE INVENTION

The present invention relates to an optical measuring device for measuring curved surfaces of a measured object using a system of optical elements. Furthermore, the present invention relates to a use of the optical measuring device as an objective for the measured object.

BACKGROUND INFORMATION

Interferometric systems are suitable for, among other things, contactless examinations of surfaces of different measured objects. To register the surface contour of an object to be examined, an object beam from a light source of the interferometer is incident on the surface of the region to be measured. The object beam reflected from the surface is fed to a detector of the interferometer and produces, together with a reference beam, an interference pattern from which the optical path length difference of the two beams may be derived. This measured optical path length difference of the two beams corresponds to the topography change of the surface.

In particular using a white-light interferometer, in which the light source emits short coherent radiation, it is also possible to scan the measured object using depth scanning. As explained in German Patent Application No. DE 103 25 443.9 (not a prior publication), for example, the short coherent radiation is divided via a beam splitter into an object beam and a reference beam. The object surface to be measured is imaged via an objective on an image recorder, such as a CCD camera ("charge-coupled device" camera) and has the reference wave produced by the reference beam superimposed thereon. Depth scanning may be performed by moving a reference mirror which reflects the reference beam or the objective in relation to the measuring device. As the object moves, the image plane of the object and the reference plane are in the same plane. During depth scanning, the object remains fixed in the visual field of the CCD camera, and the object is only moved in the depth axis in relation to the reference plane. In this way, technical surfaces may be measured with a depth resolution in the range of a few nanometers. The technical foundations of this measurement method are also found in the article "Three-dimensional sensing of rough surfaces by coherence radar" (T. Dresel, G. Häusler, H. Venzke, Appl. Opt. 31 (7), pp. 919-925, 1992).

If the surface of the object to be measured in this case is not a uniform, flat plane, a special objective is necessary for measuring the object. This is because it must be ensured during every measurement procedure that the beams are incident perpendicularly on the surfaces to be measured during scanning. For example, a system of optical elements, using which even conical surfaces may be measured, is described in German Patent Application No. DE 101 31 778. Using the panoramic lens presented therein, even surfaces whose shape corresponds to the inner or outer surfaces of a cone may be measured. The beams are deflected by the panoramic lens onto the different surfaces of the measured object, which are not parallel to one another, in such a way that they are incident perpendicularly on the particular measured surfaces. However, no splitting of the beams incident on the panoramic lens into measurement and reference beams is provided. Therefore, a relative comparison of the conical measured surfaces of the measured object to preferably planar reference surfaces is not possible.

SUMMARY OF THE INVENTION

The optical measuring device according to the present invention has the advantage that a comparison of even curved, for example, conical, measured surfaces of a measured object with reference surfaces is made possible. Particularly advantageously, even measured surfaces which are not directly accessible to the light beam may be measured and compared to a reference surface. Alternatively, the optical measuring device may also be used as a special objective for the measured object in a measuring configuration of an interferometer known per se, in particular a white-light interferometer.

DETAILED DESCRIPTION

Figure 1:
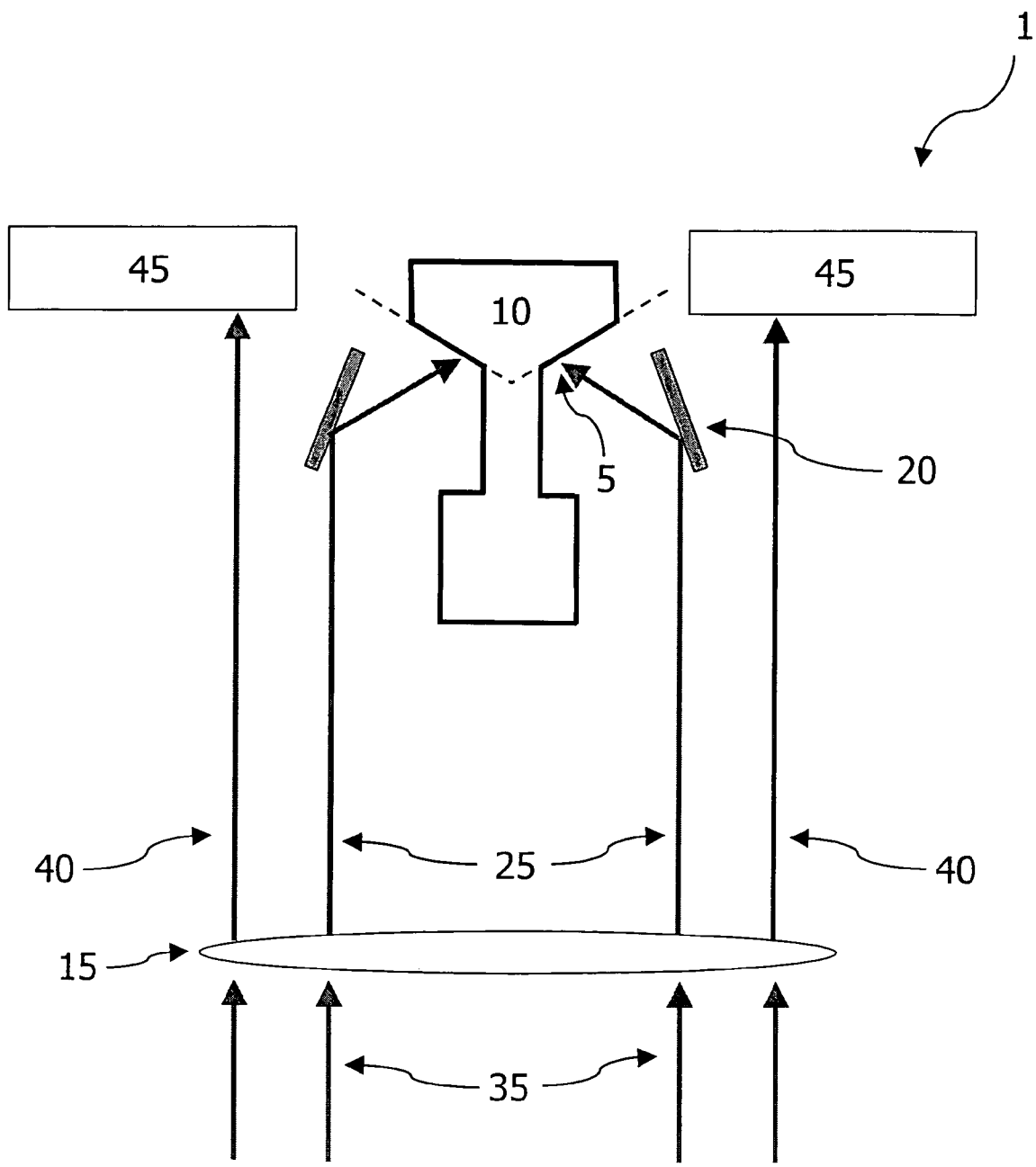
FIG. 1 shows a first system of the optical elements in the measuring device.

A first embodiment of measuring device 1 according to the present invention having a system of optical elements is shown in FIG. 1. A lens system 15, a deflection optics 20, and a reference object 45 are illustrated as the optical elements of measuring device 1. Furthermore, a measured object 10, a component in this case, has curved surfaces 5. In principle, curved surface 5 may at least partially have the internal or external shape of a conical or cylindrical surface or of a saddle surface. In this example, curved surface 5 is a conical surface, i.e., the shape of the surface to be measured corresponds to a conical section. For clarity, in FIG. 1 the conical shape of curved surface 5 is shown by dashed lines.

Light beams 35 incident on lens system 15 first run as parallel beams toward the object side, lens system 15 having at least one lens. Deflection optics 20 and reference object 45 are positioned in such a way that a first part 25 of light beams 35 incident on lens system 15 is directed perpendicularly via first deflection optics 20 onto conical surfaces 5 of measured object 10, while a second part 40 of light beams 35 incident on lens system 15 is directed onto reference object 45. Incident beams 35 are split into a first part 25 and second part 40 in that only a part of incident beams 35 are incident on deflection optics 20. In this example, deflection optics 20 includes a deflection mirror. The deflection mirror may preferably be a conically shaped mirror so that it is adapted to the shape of surface 5 to be measured. Therefore, the deflection mirror and thus deflection optics 20 has an axially symmetric shape. In any case, first part 25 of the beams is incident perpendicularly on surfaces 5 to be measured after deflection by deflection optics 20.

Second part 40 of incident beams 45 is incident without any deflection on reference object 45. If measured object 10 is a symmetrical component, such as a turned part, reference object 45 is preferably also positioned symmetrically around the component. Reference object 45 then has an axially symmetric shape, like deflection optics 20. Measuring device 1 thus splits incident light beams 35 into two concentric, incident "light cylinders," the external light cylinder (second part 40 of incident light beams 35) detecting reference object 45 and the internal light cylinder (first part 25 of incident light beams 35) being deflected onto measured object 10. Reference object 45 typically has a flat surface on which second part 40 of the beams is incident perpendicularly.

First part 25 and second part 40 of beams 35 are reflected on surface 5 to be measured and on the flat surface of reference object 45, respectively, and led back out of measuring device 1 according to the present invention via lens system 15, i.e., in the opposite direction from the object side. Furthermore, first part 25 and second part 40 of beams 35 are fed to a light-sensitive detector and analyzed to produce image data, which ideally represents flat surfaces, so that a relative comparison of surfaces 5 of object 10 to be measured with the surface of reference object 45 is made possible. A suitable calibration is to be performed if necessary for a direct comparison. Through the relative comparison of both surfaces, a possibly existing height difference may be established.

Figure 2:
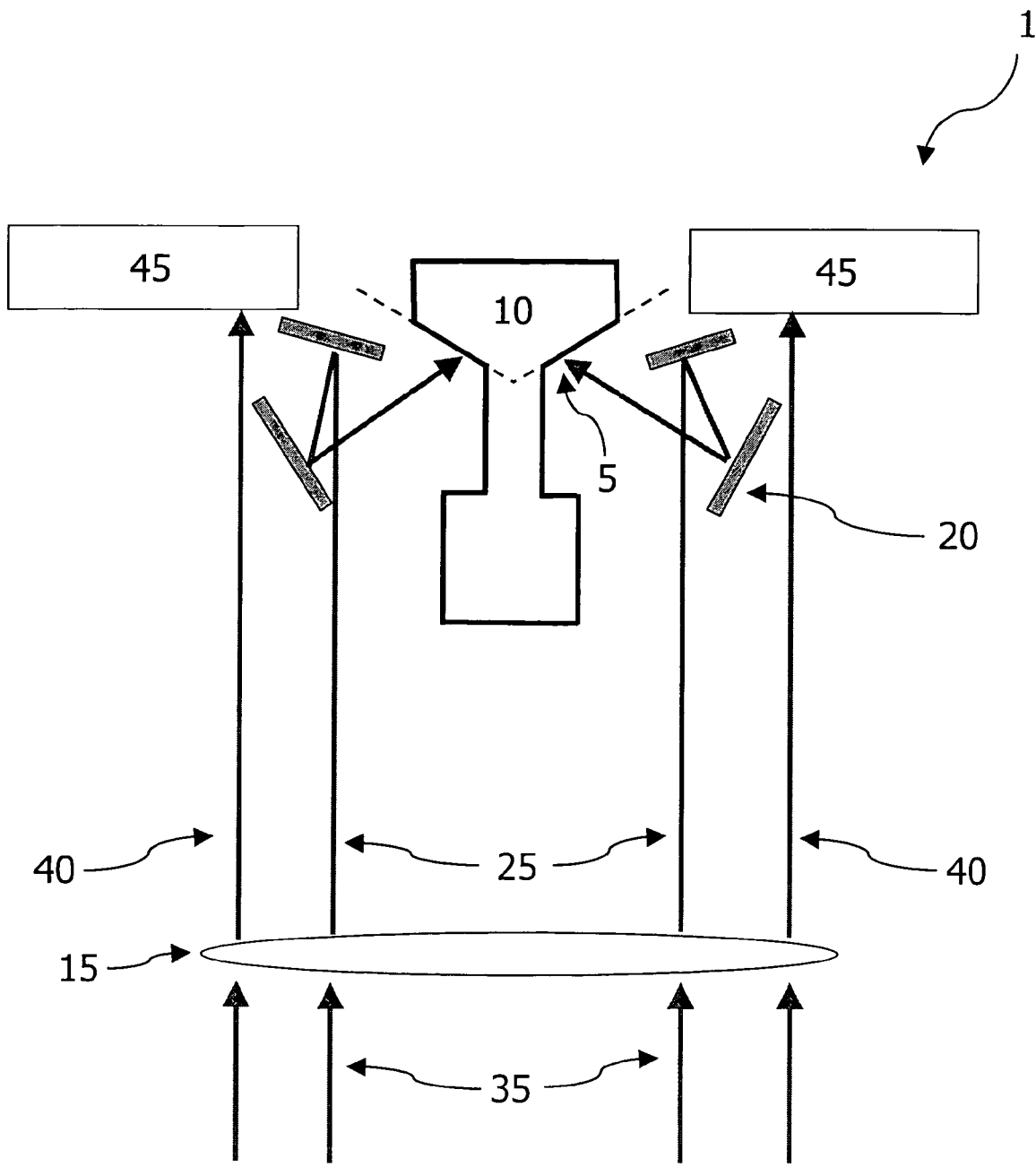
FIG. 2 shows a second system of the optical elements in the measuring device.

In a second embodiment of measuring device 1 according to FIG. 2, with an otherwise identical system of the optical elements as in the first embodiment, first deflection optics 20 is formed by multiple mirrors. In this case, the mirrors are positioned so that first part 25 of light beams incident on lens system 15 is directed onto curved surfaces 5 after multiple deflections. Multiple deflections are provided in particular if curved surfaces 5 are difficult to access optically and perpendicular incidence of first part 25 of incident light beams 35 onto curved surfaces 5 may not be achieved through one single deflection.

Figure 3:
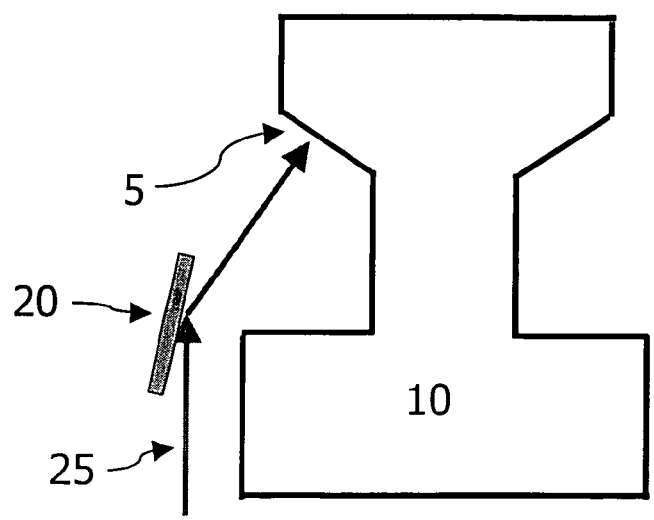
FIG. 3 shows a system of a deflection optics with a measured surface which is not directly accessible.

Furthermore, it is, of course, possible in principle, as shown in FIG. 3, for a curved surface 5 covered by other regions, which is not directly accessible to first part 25 of incident beams 35, to even be reached using only one deflection mirror of deflection optics 20.

Furthermore, if necessary, second part 40 of light beams 35 incident on lens system 15 may also be directed via a second deflection optics (not shown in the figures) onto reference object 45. The use of a second deflection optics, which is provided for the deflection of second part 40 of beams 35, may be advantageous, for example, if reference object 45 does not have a flat surface. As for first part 25 of beams 35, perpendicular incidence of second part 40 of beams 35 on the non-flat surface of reference object 45 is ensured using the second deflection optics.

Figure 4:
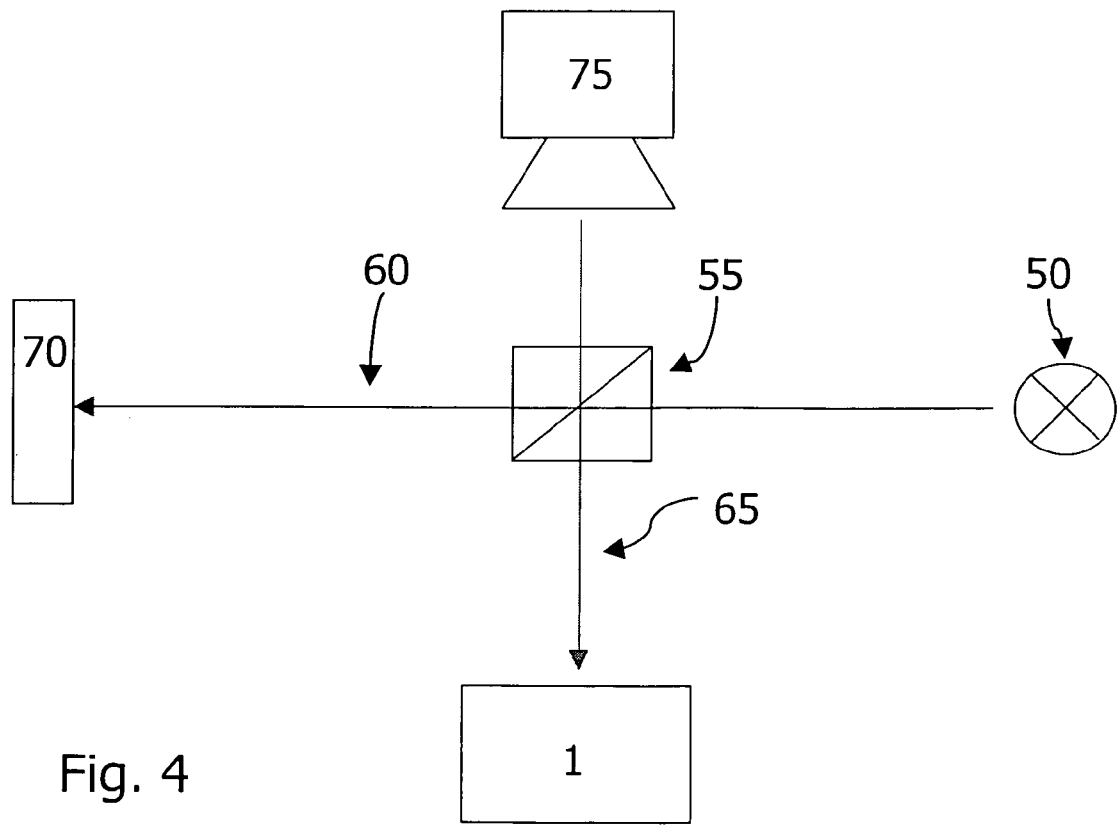
FIG. 4 shows an interferometric measuring configuration having the measuring device according to the present invention as a special objective.

Measuring device 1 is also suitable for use as a special objective for measured object 10 in a measuring configuration of an interferometer known per se, in particular a white-light interferometer. Such a measuring configuration according to Michelson is shown in FIG. 4 and its measuring principle is known: in white-light interferometry (short coherence interferometry) a light source 50 emits a short coherent radiation. The light is divided via a beam splitter 55 into a reference beam 60 and an object beam 65. Reference beam 60 is reflected further by a reference mirror 70 positioned in the reference light path and reaches an image recorder 75 again via beam splitter 55. The light waves of reference beams 60 are superimposed on the light waves of object beams 65 therein, which are in turn deflected and reflected on curved surfaces 5 of measured object 10 or on reference object 45 via the special objective according to the present invention, which is positioned in the object light path. As already noted, object beams 65 and/or light beams 35 incident on lens system 15 of the special objective are split into a first part 25 and second part 40 in order to make a comparison of the surfaces possible. Of course, the use of measuring device 1 as a special objective is also possible in a measuring configuration of an autofocus sensor or a laser, heterodyne, or other type of interferometer.

In summary, through controlled splitting and perpendicular alignment of light beams 35 to curved surfaces 5 of measured object 10 and/or on reference object 45, simultaneous and planar measurement of both surfaces is made possible. In particular, the system of the optical elements allows even covered areas of measured object 10 which are difficult to access to be measured.

What is claimed is:

1. A device, comprising:
   a system of optical elements, the optical elements including at least one lens system and at least one first deflection optics, the lens system and the first deflection optics being situated such that a first part of light beams incident on the lens system is directed perpendicularly onto curved surfaces of the measured object via the first deflection optics, and a second part of the light beams incident on the lens system is directed onto a reference object,
   wherein the first deflection optics includes at least one deflection mirror.

2. The device according to claim 1, wherein the at least one deflection mirror is a conically shaped mirror.

3. The device according to claim 1, wherein at least one of the first deflection optics and the reference object has an axially symmetric shape.

4. The device according to claim 1, wherein the reference object has a flat surface.

5. The optical measuring device according to claim 1, wherein the measuring device is configured as a special objective for the measured object in a measuring configuration of one of an autofocus sensor and an interferometer.

6. The device according to claim 1, wherein the measuring device is configured as a special objective for the measured object in a measuring configuration of one of a laser, heterodyne, and white-light interferometer.

7. A device, comprising:
   a system of optical elements, the optical elements including at least one lens system and at least one first deflection optics, the lens system and the first deflection optics being situated such that a first part of light beams incident on the lens system is directed perpendicularly onto the curved surfaces of the measured object via the first deflection optics, and a second part of the light beams incident on the lens system is directed onto a reference object,
   wherein the first deflection optics includes multiple mirrors situated in such a way that the first part of the light beams incident on the lens system is directed onto the curved surfaces after multiple deflections.

* * * * *